United States Patent
Pal

(10) Patent No.: US 7,386,563 B1
(45) Date of Patent: Jun. 10, 2008

(54) METHOD FOR USING DEFERRED COLUMN RETRIEVAL TO IMPROVE ROW RETRIEVAL AND QUERY PERFORMANCE OF OLE DB APPLICATIONS

(75) Inventor: Suprio Pal, Corona, CA (US)

(73) Assignee: Unisys Corporation, Blue Bell, PA (US)

( * ) Notice: Subject to any disclaimer, the term of this patent is extended or adjusted under 35 U.S.C. 154(b) by 673 days.

(21) Appl. No.: 10/733,003

(22) Filed: Dec. 11, 2003

(51) Int. Cl.
*G06F 17/30* (2006.01)
(52) U.S. Cl. ...................................... 707/102
(58) Field of Classification Search ............ 707/1–10, 707/100–104.1, 200–206
See application file for complete search history.

(56) References Cited

U.S. PATENT DOCUMENTS

| | | | |
|---|---|---|---|
| 5,760,770 A | 6/1998 | Bliss et al. | |
| 5,960,214 A | 9/1999 | Sharpe, Jr. et al. | |
| 6,246,410 B1 | 6/2001 | Bergeron et al. | |
| 6,298,478 B1 | 10/2001 | Nally et al. | |
| 6,332,163 B1 | 12/2001 | Bowman-Amuah | |
| 6,353,820 B1 * | 3/2002 | Edwards et al. | 707/2 |
| 6,385,643 B1 | 5/2002 | Jacobs et al. | |
| 6,460,043 B1 * | 10/2002 | Tabbara et al. | 707/100 |
| 2006/0282456 A1 * | 12/2006 | Kapoor et al. | 707/102 |

* cited by examiner

*Primary Examiner*—Diane Mizrahi
(74) *Attorney, Agent, or Firm*—Alfred W. Kozak; Robert P. Marley; Charles A. Johnson

(57) ABSTRACT

The present invention is a method for facilitating the use of deferred column retrieval in order to improve row retrieval and query performance of OLE DB objects. The method enables OLE DB applications to access columns present in index structures without accessing the base table, enables optimization and faster running queries, as well as detecting various data access patterns, which could facilitate usage of the index for data retrieval.

2 Claims, 12 Drawing Sheets

NORTHWINDOLAP - Schema Utility

File  View  Tools  Help northwindolap
  acc_empterritorys
  cat_catid_idx
  cat_catname_idx
  categories
  cust_company_idx
  cust_custid_idx
  customers
  emp_empid_idx
  emp_lastname_idx
  emp_psticode_idx
  ord_cusorder_idx
  ord_employid_idx
  ord_orderdate_idx
  ord_orderid_idx
  orddt_ordetl_idx
  orddt_orderid_idx
  orderdetails
  orders
  prod_category_idx
  prod_prodname_idx
  prod_product_idx
  prod_supplid_idx
  products

| Database Name | Base CCS | Base Year | Century Start |
|---|---|---|---|
| northwindolap | EBCDIC | 1957 | 1930 |

| Structure Name | Structure Type | Record Length |
|---|---|---|
| categories | Compact Data Set | 792 |
| customers | Data Set | 270 |
| employees | Data Set | 1050 |
| empterritories | Ordered Data Set | 30 |
| northwindclap | Global Data Set | 12 |
| orderdetails | Data Set | 42 |
| orders | Data Set | 252 |
| products | Data Set | 114 |
| region | Direct Data Set | 60 |
| shippers | Unordered Data Set | 72 |
| suppliers | Data Set | 528 |
| territories | Random Data Set | 78 |

*Fig. 9A*

NORTHWINDOLAP - Schema Utility

File  View  Tools  Help empterritories
northwindolap
ord_cusorder_idx
ord_employid_idx
ord_orderdate_idx
ord_orderid_idx
crddt_crddetl_idx
crddt_orderid_idx
prod_category_idx
prod_prodname_idx
prod_product_idx
prod_supplid_idx
products
   productid
   productname
   supplierid
   categoryid
   quantityperunit
   unitinfo
   unitprice
   unitsinstock
   unitsonorder
   reorderlevel
   discontinued

| Structure Name | Structure Type | Record Length |
|---|---|---|
| products | Data Set | 114 |

| Item Name | Item Definition | Interpretation | OLE DB Type |
|---|---|---|---|
| productid | REAL(59) | REAL(59) | DBTYPE_NUMERIC |
| productname | ALPHA(40) | ALPHA(40) | DBTYPE_STR |
| supplierid | REAL(59) | REAL(59) | DBTYPE_NUMERIC |
| categoryid | REAL(59) | REAL(59) | DBTYPE_NUMERIC |
| quantityperunit | ALPHA(20) | ALPHA(20) | DBTYPE_STR |
| unitinfo | GROUP | HIDDEN | |
| unitprice | NUMBER(519,4) | NUMBER(519,4) | DBTYPE_NUMERIC |
| unitsinstock | REAL(59) | REAL(59) | DBTYPE_NUMERIC |
| unitsonorder | REAL (59) | REAL(59) | DBTYPE_NUMERIC |
| reorderlevel | REAL(59) | REAL(59) | DBTYPE_NUMERIC |
| discontinued | REAL(59) | REAL(59) | DBTYPE_NUMERIC |

*Fig. 9B*

NORTHWINDOLAP - Schema Utility

File　View　Tools　Help

- emp_psticode_idx
- employees
- empterritories
- northwindolap
- ord_cusorder_idx
- ord_employid_idx
- ord_orderdate_idx
- ord_orderid_idx
- orddt_orddtel_idx
- orddt_orderid_idx
- orderdetails
- orders
- prod_category_idx
- prod_prodname_idx
- prod_product_idx
  - productid
  - unitprice
  - unitsinstock
  - unitsonorder
- prod_supplid_idx
- products
- region
- region_acc
- ship_shipper_idx
- shippers

| Structure Name | Structure Type | Spanned Structure |
|---|---|---|
| prod_product_idx | Index Sequential | products |

| Item Name | Item Definition | Interpretation | OLE DB Type |
|---|---|---|---|
| productid | REAL(59) | REAL(59) | DBTYPE_NUMERIC |
| unitprice | NUMBER(519,4) | NUMBER(519,4) | DBTYPE_NUMERIC |
| unitsinstock | REAL(59) | REAL(59) | DBTYPE_NUMERIC |
| unitsonorder | REAL(59) | REAL(59) | DBTYPE_NUMERIC |

*Fig. 9C*

Microsoft OLE DB RowsetViewer

File  DataSource  Session  Command  Rowset  Row  Error  Tools  Window  Help

Objects  — ☐ ✕

DataSource (Unisys, DMSII.1)
  Session
    Rowset (products)

Rowset: Unisys Enterprise Database OLE DB Data Provider for Clearpath MCP

| productid | productname | supplierid | categoryid | quantityperunit |
|---|---|---|---|---|
| 3 | Aniseed S. | 1 | 2 | 12 - 550 ml b |
| 6 | Grandma's | 3 | 2 | 12 - 8 oz jars |
| 9 | Mishi Kobe | 4 | 6 | 18 - 500 g p |
| 12 | Queso Ma | 5 | 4 | 10 - 500 g p |
| 15 | Genen Sh | 6 | 2 | 24 - 250 ml b |
| 18 | Carnarvan | 7 | 8 | 16 kg pkg |
| 21 | Sir Rodrie | 8 | 3 | 24 pkgs x 4 |
| 24 | Guarana F | 10 | 1 | 12 - 355 ml c |
| 27 | Schoggi Sc | 11 | 3 | 100 - 100 g |
| 30 | Nord-Ost | 13 | 8 | 10 - 200 g gl |

*Fig. 10*

METHOD FOR USING DEFERRED COLUMN
RETRIEVAL TO IMPROVE ROW RETRIEVAL
AND QUERY PERFORMANCE OF OLE DB
APPLICATIONS

CROSS-REFERENCES TO RELATED CASES

This application is related to a co-pending application U.S. Ser. No. 10/209,481 entitled "METHOD FOR USING TRANSACTION IDENTIFIERS FOR OPTIMIZING UPDATE PERFORMANCE OF OLE DB DATABASE APPLICATIONS", which is incorporated herein by reference.

This application is related to a co-pending application U.S. Ser. No. 10/163,103 entitled "METHOD AND SYSTEM FOR ACCESSING LOGICAL RELATIONSHIP DATA IN A DATABASE FROM A DATA-ACCESS SYSTEM UTILIZING BOOKMARKS", which is incorporated herein by reference.

This application is related to issued U.S. Pat. No. 6,366,900 entitled METHOD FOR ANALYZING THE CONDITIONAL STATUS OF SPECIALIZED FILES , which is incorporated herein by reference.

BACKGROUND OF THE INVENTION

1. Field of the Invention

The method of the present invention provides a mechanism that enables OLE DB (Object Linking and Embedding Database) applications to access columns present in index structures without accessing the base table.

2. Description of Related Art

The Unisys Enterprise Database Server for ClearPath MCP (a.k.a. DMSII) consists of Tables and Indexes. MCP refers to Unisys Master Control Program. Indexes permit database applications to rapidly retrieve rows based on search criteria. Additionally, indexes permit relationships to be maintained between rows of the table. The most commonly used relationship is row ordering based on certain columns in the table known as key columns. Thus, indexes allow rapid random retrieval and ordered sequential retrieval. DMSII indexes are non-clustered, i.e. a separate disk file contains the index entries and pointers (or row addresses) to base table rows. Therefore, to fetch a row from a table via an index, at least two disk reads must be executed: (i) to fetch the block that contains the index entry from the index file and (ii) to fetch the block containing the row from the table file.

However, there are many occasions when user applications would just want to count the number of rows in a table or retrieve columns that are stored in index structures. In addition, DMSII databases also allow frequently used non-key columns (known as key-data columns) to be stored in the index structure. Since index structures are much smaller in size when compared to the base table, they allow for rapid traversal and data retrieval.

The prior art software did not detect various data access patterns, which could facilitate usage of the index for data retrieval. In particular, if the application only retrieves data from columns that are stored in the index structure, then those columns could be retrieved solely from the index. This avoids I/O operations on the base table rows and its attendant effects on database performance.

It is therefore important to have a system, which provides a mechanism that enables OLE DB applications to access columns present in index structures without accessing the base table, as the method of the present invention does.

One related art method to which the method of the present invention generally relates is described in U.S. Pat. No. 6,246,410, entitled "Method and System For Database Access". This related art method is a method and system for accessing the contents of a database from an OLE enabled user application without requiring the database to be open on the users desktop or requiring the user to know a text based data manipulation language. That is, using OLE's drag and drop methodology, a user may search the contents of a database to generate a result set of rows from the database and utilize information content from the resulting rows as desired. An OLE enabled user application is opened on a user's computer. The user then selects the location of a database to be accessed using a dialogue. Once the desired database is located, a "palette" is created at a portion of the screen of the user's computer. Once the palette is created, the user then searches and accesses the contents of the database by using drag and drop gestures in conjunction with the OLE enabled user application and the established palette.

The present invention differs from the above prior cited art in that the prior invention, provides a general method of accessing a database from a Windows based OLE application. It is not clear whether it uses OLE DB or some other data access mechanism to obtain data from the backend database. However, the method of the present invention focuses on the cases where database queries fetch a limited set of columns from a table. The current invention also checks whether the query fetches columns which are present in an index spanning the table and, if so, issues database fetch requests from only the index structure which is much more efficient than obtaining the whole row from the base table.

Another related art method to which the method of the present invention generally relates is described in U.S. Pat. No. 5,760,770 entitled "System and Method For Defining A View To Display Data". This related art method includes views and view controls which are used to display and access data created from multiple applications. Namespaces, folders, items, views and view control objects are used to abstract the data type of the data, contained in items. Therefore, data can be displayed in multiple views and the same view can be used to display data independent of the data type. To display a view, a user selects a folder that contains items. A folder, item, view, and view control work together to define the fields and data to display and the format to display them. The user can generate many views by editing one view, thereby creating a new view. An edit interface is provided allowing the user to modify a view. Modifications include entering new data in a view, defining new fields, and entering calculations based on other data. A new view control can be installed by determining what information to pass, conforming to OLE standards and entering the view control in the operating system's database registry.

The present invention differs from the above prior cited art in that the prior invention, does not deal with database queries from an OLE DB application and is therefore unrelated to the current invention.

BRIEF SUMMARY OF THE INVENTION

It is therefore an embodiment of the invention to provide an optimization of a query by utilizing the FIND KEY OF feature of the DMSII back-end database. The FIND KEY OF API allows an application to fetch data only from the index structure. Such queries will be significantly faster than queries that access the base table directly to fetch columns. This is because an index structure contains a far greater number of entries per disk block compared to the base table and thus can be scanned faster with fewer disk reads while consuming lower main (RAM) memory resources. Being aware of this optimization is important for users so that unnecessary inclusion of columns from the table can be avoided. The OLE DB Data Provider optimizes the fetching of data by accessing the index without going to the base table if the fetch uses an index (that is, an Enterprise Database Server set or subset) and retrieves columns only from the index or retrieves no columns at all (for instance, scanning for counting records without binding any data columns).

Consumer applications using the OLE DB model create bindings for the various table columns before retrieving the data in those columns. This invention takes advantage of this fact in order to decide whether access to the base table is needed. If the consumer application accesses a database table via an index and creates column bindings for only the key and key-data columns, then the data for those columns is supplied by the OLE DB provider from the index structure. Sometimes, the OLE DB application would only want to count the number of rows in a table and just traverse one of the index structures from beginning to end without creating any column bindings. In this case also, the OLE DB provider only accesses the index entries to do the traversal thus avoiding any I/O on the base table.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative, in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

GLOSSARY ITEMS

1. OLE (Object Linking and Embedding) APPLICATIONS: A distributed object system and protocol from Microsoft, also used on the Acorn Archimedes. OLE allows an editor to "farm out" part of a document to another editor and then reimport it.
2. INDEX STRUCTURES: A structure where a number is used to select an element of a list, vector, array or other sequence. See also Index File.
3. INDEX FILE: A database file which contains the key and a pointer which points to a record in the table data file. The index file is used to search for the data record based on a key value for efficient rapid access. See also Index Structure.
4. INDEX: This is a term which also indicates the key.
5. Indexed Organization: The permanent, logical file structure in which each record is identified by the value of one or more keys within that record.
6. BASE TABLE: A structure in the database that contains rows. Each row in the table consists of one or more columns.
7. NON-KEY COLUMNS (AKA KEY-DATA/KEYDATA** COLUMNS): A column that is present in an index structure to provide fast access but is not used for collation.
8. BINDINGS: A binding contains information about the consumer's buffer. The most notable information is the ordinal of the column in the table to which the binding applies (iOrdinal), what is bound [dwPart] (the data value, its length, and its status), the offsets in the buffer to each of these parts (obValue, obLength, obStatus), and the length (cbMaxLen) and type (wType) of the data value as it exists in the consumer's buffer. Each binding associates, or binds, a single column or parameter to the consumer's buffer.
9. KEY COLUMNS (AKA KEY*): A column that is used for collating an index (See also Item #25).
10. FIND KEY OF: It is a method of retrieving only the data columns present in an index structure.
11. DEFERRED COLUMN RETRIEVAL: For a deferred column, the provider is not required to retrieve data from the data store until IRowset::GetData is called for that column. It is provider-specific when the data in a deferred column is actually retrieved. For example, it might be retrieved when the command is executed, when the row handle is fetched, lazily in the background, or when IRowset::GetData or a method on another interface is called for the column.
12. DATA ACCESS SYSTEM: A Data Access System defines the model used by applications access data. The model typically assumes the data is not directly accessible by the application but resides in some separate data store, such as a file or e-mail system, a database, or a resource on the Internet. In such a Data Access system, the application requests information from an intermediary that returns a copy of the desired data to the application. Although different data stores have different native means to access their information, the intermediary presents a single, consistent means of data access to the application.
13. ENTERPRISE DATABASE SERVER (MCP PLATFORM): The actual name used in Unisys product literature for the DMSII database management system.
14. ROWSET: Rowsets are the central objects that enable OLE DB components to expose and manipulate data in tabular form. A rowset object is a set of rows in which each row has columns of data. For example, providers present data, as well as metadata, to consumers in the form of rowsets. Query processors present query results in the form of rowsets.
15. ACCESSOR: An accessor is a data structure created by the consumer that describes how row or parameter data from the data store is to be laid out in the consumer's data buffer. For each column in a row (or parameter in a set of parameters), the accessor contains a binding. A binding is a data structure that holds information about a column or parameter value, such as its ordinal value, data type, and destination in the consumer's buffer. When calling a method that transfers data, such as IRowset::GetData, IRowsetChange::SetData, or ICommand::Execute, the consumer passes as parameters to the method an accessor handle (or, when transferring parameter data, a DBPARAMS structure containing an accessor handle) and a pointer into the consumer's data buffer. The provider uses the accessor to determine how to transfer the data to or from the consumer's buffer.
16. CREATEACCESSOR: It is the method call used to create an accessor from a set of bindings.
17. SESSION: Sessions provide methods for creating commands and rowsets and for creating and modifying tables and indexes. They also define transaction scope and can be used to create transaction objects, which are used to control nested transactions 18. TRANSACTION: A unit of work in which a series of related operations occur during an application process. A transaction executes exactly once and is atomic-either all of the work is done or none of it is.
19. ISOLATION LEVEL: Transaction isolation levels are a measure of the extent to which changes made outside a transaction are visible to that transaction. In particular, transaction isolation levels are defined by the presence or absence of the following phenomena—Dirty reads, Non-repeatable reads and phantoms.
20. READ COMMITTED: A transaction operating at the Read Committed isolation level cannot see changes made by other transactions until those transactions are committed. At this level of isolation, dirty reads are not possible but non-repeatable reads and phantoms are possible.
21. DEFERRED MODE: Indicates a data retrieval mode in which the Provider is retrieving only certain columns of a table. For other columns, the provider is not required to retrieve data from the data store until IRowset::GetData is call d for that column.
22. OLE DB INTERFACE API: OLE DB is a set of COM-based interfaces that expose data from a variety of sources. OLE DB interfaces provide applications with uniform access to data stored in diverse information sources, or data stores and that also provide the ability to implement additional database services. These interfaces support the amount of DBMS functionality appropriate to the data store, enabling the data store to share its data.
23. MASTER CONTROL PROGRAM (MCP): Unisys Master Control Program/Advanced Systems. The comprehensive virtual memory operating system which drives the Unisys ClearPath/A-Series family of hardware.
24. DATA MANAGEMENT SYSTEM II (DMSII): A specialized system software package used to describe a database and maintain the relationships among the data elements in the database. This system is described in a September 1977 Publication of Unisys Corporation, entitled "Getting started with DMSII," Unisys Publication No. 8807 6625-000.
25. KEY: 1) A field used to locate or identify a record in an indexed file. (2) In COBOL, a data item that identifies the location of a record, or a group of data items that identifies the ordering of data. (3) In Data Management System II (DMSII), a field that serves as a retrieval key for a set or subset.
26. KEY COLUMNS: This is a portion of a data record which contains the key data.
27. KEY FIELD: This is a portion of a data record which contains key data.
28. KEYDIOII: This is a software methodology designated as Unisys Indexed Sequential Access Method (ISAM) software for COBOL 74 and Report Program Generator (RPG) programming languages. It is based on DMSII (Data Management System II) so as to take advantage of the features of DMSII. KEYDIOII is basically described in Unisys Corporation Publication 5044043.372 (1988).
29. DATA SET: A disk file (potentially, a group of disk files) containing data records all in a similar internal format. An e-@ction Unisys Enterprise Database Server structure type declared in DASDL (Data And Structure Definition Language).
30. SET: Same as an Index Structure (see #4).
31. OLE DB DATA PROVIDER: An OLE DB Data Provider is any software component that exposes an OLE DB interface. The OLE DB provider exposes the OLE DB programming model by using an object model—the set of COM objects that accomplish the tasks in the programming model. Providers expose the OLE DB interfaces on the COM objects that encapsulate a portion of the functionality needed to access and update data.
32. COLUMN BINDING (BINDINGS IN A COLUMN): Same as bindings (see #8).
33. READ UNCOMMITTED (FIG. 6): Transaction operating at the Read Uncommitted level can see uncommitted changes made by other transactions. At this level of isolation, dirty reads, non-repeatable reads, and phantoms are all possible.
34. ORACLE DATABASE: The Database Management system implemented by Oracle Corporation.
35. MICROSOFT EXCEL: A spreadsheet program from Microsoft, part of their Microsoft Office suite of productivity tools for Microsoft Windows and Macintosh. Excel is probably the most widely used spreadsheet in the world.
36. DATA PROVIDER OBJECT: The COM component in the Unisys OLE DB implementation that exposes the OLE DB interfaces. It passes client requests for data through the network data transport components to the Worker on the MCP host and returns requested data from the Worker to the client application in the requested format.
37. TRANSPORT OBJECT: The COM component in the Unisys OLE DB implementation that is used for communicating with the Server/Worker processes on the MCP platform by means of the TCP/IP network connecting the client workstation and the MCP server.
38. WORKER: The module on the MCP host which implements most of the functionality to access the Enterprise Database Server (i.e. DMSII) software for inquiries, transactions and updates.
39. SERVER LIBRARY: It is a shared-by-all library executing on the MCP platform that manages the TCP/IP connections emanating from client workstations. It spawns Worker tasks to handle each connection and manages its lifetime.
40. TCP/IP NETWORK: The d facto standard Ethernet protocols incorporated into 4.3BSD Unix. TCP/IP was developed by DARPA for internetworking and encompasses both network layer and transport layer protocols. While TCP and IP specify two protocols at specific protocol layers, TCP/IP is often used to refer to the entire DoD protocol suite based upon these, including telnet, FTP, UDP and RDP.
41. CLEARPATH OS 2200: Another Unisys mainframe computer family which run the OS2200 operating system.
42. NULL ACCESSOR: An accessor for which no column bindings have been created.
43. BOOKMARK: Bookmarks are placeholders that enable the application to return quickly to a row. Applications that use bookmarks to identify rows to a provider treat bookmarks as opaque binary values.
44. DATA RECORD: Same as a row. A row is a set of related data items, or columns, that are treated as a unit.
45. COLLATION: This specifies the bit patterns that represent each character (character set) and the rules by which characters are sorted and compared.

BRIEF DESCRIPTION OF THE DRAWINGS

FIG. 9A is a screen shot showing example of a schema for tables and indexes.

FIG. 9B is a screen shot showing example of a table and its constituent columns and the native database type and the OLE DB type of the columns.

FIG. 9C is a screen showing examples of key and keydata columns stored in Index structures.

FIG. 10.*is* a screen shot showing the data in a Rowset viewed using the RowsetViewer application which uses a OLE DB Provider to retrieve data.

DETAILED DESCRIPTION

Several embodiments of the present invention are described herein in the context of facilitating accessing and updating of data in a database by a data-access system in communication with the database and a client application. Those of ordinary skill in the art will realize that the following description of the present invention is illustrative only and is not intended to be in any way limiting. Other embodiments of the invention will readily suggest themselves to such skilled persons having the benefit of this disclosure. Reference will now be made in detail to an implementation of the present invention as illustrated in the accompanying drawings. The same reference numbers will be used throughout the drawings and the following description to refer to the same or like parts.

Figure 1:
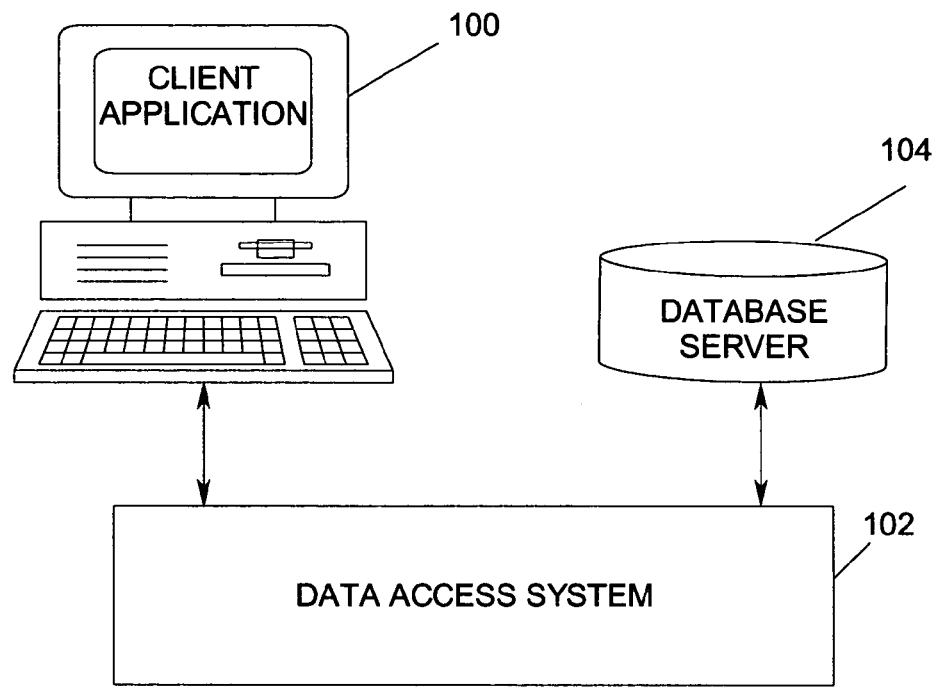
FIG. 1 is a top-level block diagram of a system that may employ the methods and system of the present invention.

Referring now to the drawings and FIG. 1 in particular, a top-level block diagram of a system that may employ the methods and systems of the present invention is shown. A client application 100 executing on a computing system is illustrated. The client application 100 is in communication with data access system 102 which in turn is in communication with database server 104. Database server 104 may be local or at a remote location relative to the computing system executing client application 100. The data access system 102 is tasked with receiving requests for data from client application 100, then communicating with the database 104 to obtain the requested data, and providing the client application with the obtained data. For simplicity, only one computing system executing a client application 100 is illustrated in FIG. 1 although it should be noted that many more computing systems on which multiple client applications 100 reside, may also be coupled to the data access system 102 to access a number of database servers 104.

Figure 2:
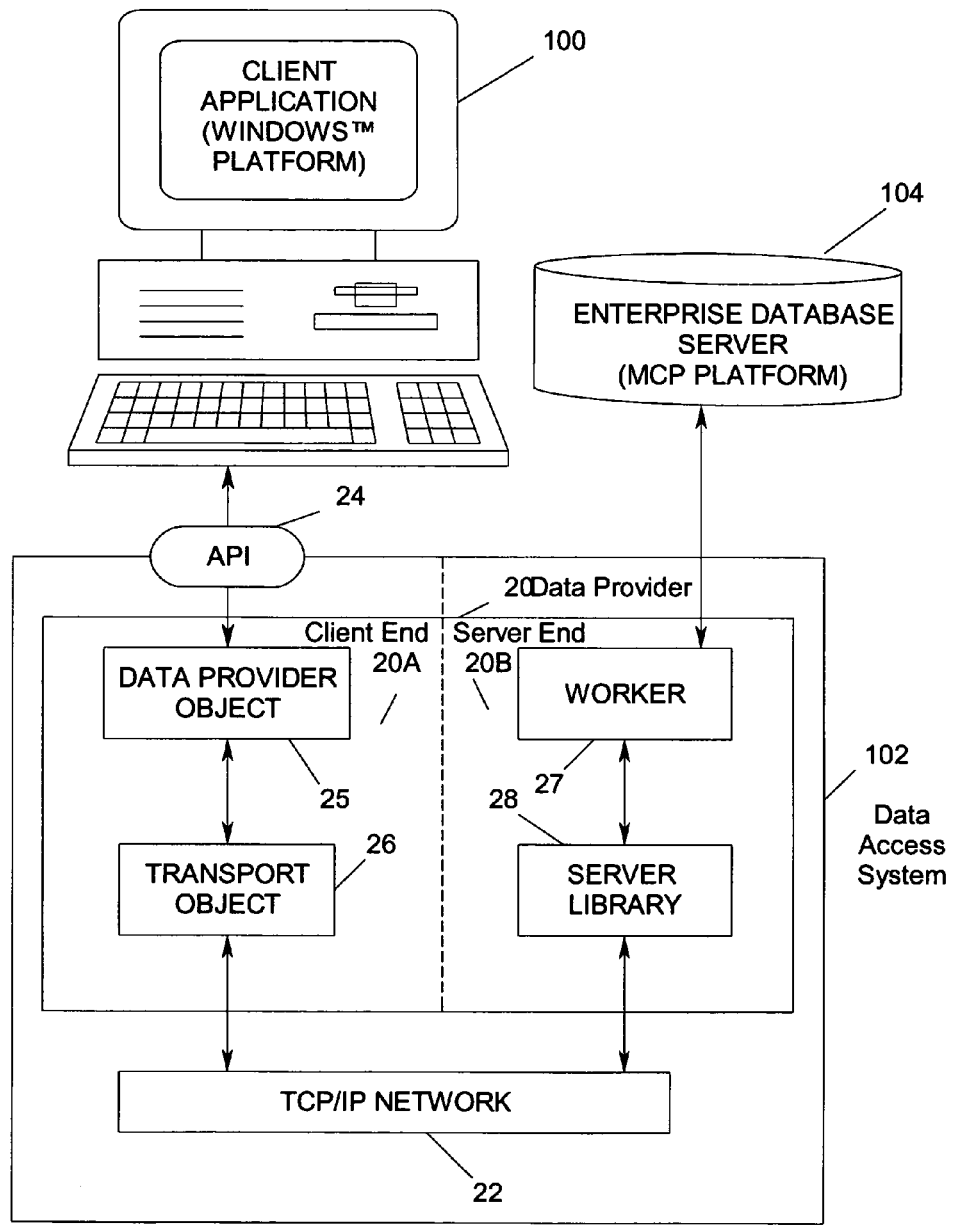
FIG. 2, developed as FIG. 2 and FIG. 2A, is an expanded block diagram of an exemplary system that may employ the methods and system of the present invention.

FIG. 2 is an expanded block diagram of an exemplary system that may employ the methods and systems of the present invention as shown in FIG. 1. To better illustrate the functioning of the present invention, an exemplary embodiment of the present invention is used throughout the specifications in which the data-access system 102 is a Unisys OLE DB Data Provider and interfacing with a Windows™ client application 100 (such as substantially all versions of Microsoft Windows released from 1995-2003, Windows NT and XP) at one end and with an Enterprise Database Server 104 operating on a Unisys ClearPath Master Control Program (MCP) platform at the other end, although it should be noted that the present invention is not in anyway limited to the foregoing exemplary products.

As shown in FIG. 2, the data access system 102 includes the OLE DB Data Provider 20 and the communication subsystem 22. The OLE DB Data Provider 20 is a two-tiered request-response processing application that includes a client-end 20A and a server-end 20B which communicate with one another via the communication subsystem 22, such as a TCP/IP network. The client-end 20A includes data provider 25 and transport object 26, while the server-end 20B includes the server library 28 and worker 27. The OLE DB Data Provider 20 enables the client application 100 to request data from the Enterprise Database Server 104 operating on a ClearPath Master Control Program (MCP) platform (also known as DMSII by those skilled in the art). The Windows™ client application 100 can be remote or it can be executing on the Windows™ operating system side of a Clear Path MCP server. In an exemplary embodiment, the client application 100 runs on the same platform as the client-end 20A of the OLE DB Data Provider 20.

The overall operations of the present invention will now be disclosed in greater detail in FIGS. 3-7 in conjunction with FIG. 2. As shown in FIG. 2, a client-request for information from the client application 100 is received by the data provider object 25 which interacts with the client application via an application program interface (API) 24. In an exemplary embodiment, the data provider object 25 presents an OLE DB data source API 24 to the client application 100. Once the client-request is received in the data provider 25, the data provider object 25 then passes the client-request to the transport object 26. The transport object 26 is adapted to use the communication subsystem 22 to forward the client-request to server-end 20B, at where it is ultimately received by Worker 27 which is activated on demand by the Server Library 28. The Worker 27 then interacts with the Enterprise Database Server 104 to search for and obtain the requested information from the Enterprise Database Server 104. Once the information is obtained, the Worker 27 packages the information in a proprietary data format and forwards it back to the data provider 25 via the communication subsystem 22 and transport object 26. The data provider object 25 subsequently converts the information received from the Worker 27 into a predetermined OLE DB format recognized or requested by the client application 100 and then presents the information to the client application 100 in that format. In other words, the Worker 27 sends data from the backend database in a native format and the Provider 25 converts it to requested OLE DB data types. In an exemplary embodiment of the present invention, the Worker 27 and data provider 25 each include data-storage capabilities such as random-access-memory (RAM) or a magnetic data-storage disk for storage of received data.

In an exemplary embodiment, three types of data providers are included within the OLE DB Data Provider 25: (1) Enterprise Database Server data provider such as Unisys.DMSII, which supports read/write access to data form the Enterprise Database Server 104; (2) MCP Data File data provider such as Unisys.NXFile, which allows read-only access to data from MCP sequential, relative and indexed (KEYEDIO and KEYEDIOII) files; and (3) DMS, (Data Management System) data provider, which allows access to databases on ClearPath OS 2200 databases Generally, a client application 100 initiates one such data provider 25 for each database 104 from which it requires data by creating an instance of the data provider object 25 as data source. A client application 100 can initiate simultaneous data provider objects 25. The databases 104 can be on the same or different systems. In turn, the data provider object 25 starts a single transport object 26 and Worker 27 which retrieve data from the database 104 and returns it to the data provider object 25 for presentation to client application 100. In an exemplary embodiment using the Windows™ application, a Microsoft multithreading operation is supported during this process.

Typically, a data provider object 25 initiates a Worker 27 to perform the activities for data retrieval from database 104 required by the data provider object 25. The Worker 27 retrieves the data from the database 104 and prepares it for transport through the server library 28 and the communication subsystem 22 to the transport object 26. The data provider object 25 operations are terminated by the client application 100, but as long as the data provider object 25 is active, the client application 100 can continue to use it for data requests. The system automatically terminates the operations of the Worker 27 once the operations of data provider object 25 that the Worker 27 has been serving, has also been terminated.

FIG. 2A illustrates an expanded block diagram as currently used in the art for accessing data from a database. In databases such as database 204, data are stored in data tables, with each table typically containing a set of rows, and each row having column-attributes in which the data is stored. For ease of search and access, information stored in each table is often categorized based on predetermined characteristics of the stored data. For example, in the environment of a bank, a typical bank customer table 200 contains a set of rows 202, such as Row 1—Row N wherein each row 202 corresponds to an individual customer. Each customer row has also a number of column-attributes (not shown) in each of which data corresponding to that customer is stored, such as customer name, address, bank account number, and current and previous account balances. When a modification to a bank customer table 200 is to be done, such as updating customer records, a client application 100, such as a banking client application, requests obtaining of one or more rows 202 from one or more tables in the database 204. Modifications are done to one or more columns of each individual row and then the modified rows are transmitted to the data store. When inserting new customer information, an empty row is generally first created and then all the required column attributes such as customer-name, address, bank account number filled. This modified row is then transmitted to the data store to be created in the customer table.

Although currently OLE DB data providers (20) enjoy widespread usage for retrieval of data from databases, improvements can always be made, particularly when the OLE DB Data Providers are used for updating accessed data from a database.

Since the OLE DB Provider is a two tiered system with client and server components, the Data Provider implementation uses objects on the client side to represent database entities like tables, rows, indexes etc. For example, a rowset object represents and provides access to a table. And, a row handle object represents provides access to a row fetched by the application. The rowset object is implemented as a C++ class called CRowset and this is contained in the Provider object 25.

A portion of the CRowset class is described as follows:

```
class CRowset {
    public:
        CRowset (IUnknown    *pUnkOuter,
            :
            :
            );                  // Constructor
        ~CRowset (void);        // Destructor
```

```
        // IAccessor Methods
            :
            virtual HRESULT CreateAccessor (
                                    DBACCESSORFLAGS,
                                    :
                                    const DBBINDING[ ],
                                    :
                                    )
        // IRowset Methods
            virtual HRESULT GetData(
                                    HROW,
                                    HACCESSOR,
                                    void *);
        private:
            :
            BOOL                m_GetData_CanDefer;
            :
    }
```

In the above CRowset class, the method with the same name as the class, CRowset is called a constructor, which is executed when the class is instantiated. Similarly the method ~CRowset is called a destructor and is executed when the class is destroyed. Methods such as CreateAccessor, GetData are used by consumer applications to create accessors and transfer column data to the application's data buffer. Among several private member variables of this class is a Boolean member variable called 'm_GetData_CanDefer'. This variable is used to indicate whether rows can be fetched solely from the index associated with this rowset based on the column bindings and is explained later.

The DBBINDING structure as specified in the OLE DB specification describes a single binding as follows:

```
typedef struct tagDBBINDING {
    DBORDINAL           iOrdinal;
    DBBYTEOFFSET        obValue;
    DBBYTEOFFSET        obLength;
    DBBYTEOFFSET        obStatus;
    ITypeInfo           *pTypeInfo;
    DBOBJECT            *pObject;
    DBBINDEXT           *pBindExt;
    DBPART              dwPart;
    DBMEMOWNER          dwMemOwner;
    DBPARAMIO           eParamIO;
    DBLENGTH            cbMaxLen;
    DWORD               dwFlags;
    DBTYPE              wType;
    BYTE                bPrecision;
    BYTE                bScale;
} DBBINDING;
```

The following table shows a consumer's buffer containing 10 bytes for a string, 2 unused bytes to properly align the string's status and length values, 4 bytes for the string's status, 4 bytes for the string's length, 2 unused bytes to properly align the integer's status value, 2 bytes for a 2-byte integer, and 4 bytes for the integer's status. It also shows the main binding information used to bind the string to column 1 and the integer to column 2. The Table I summarizes these bindings.

TABLE I

| Element | String binding | Integer binding |
| --- | --- | --- |
| Ordinal (iOrdinal) | 1 | 2 |
| Bound parts (dwPart) | DBPART_VALUE | | DBPART_VALUE | |

TABLE I-continued

| Element | String binding | Integer binding |
| --- | --- | --- |
| | DBPART_LENGTH | DBPART_STATUS | DBPART_STATUS |
| Offset to data value (obValue) | 0 | 22 |
| Offset to status (obStatus) | 12 | 24 |
| Offset to length (obLength) | 16 | N/A |
| Data type (wType) | DBTYPE_STR | DBTYPE_I2 |
| Buffer length (cbMaxLen) | 10 | 2 |

Figure 3:
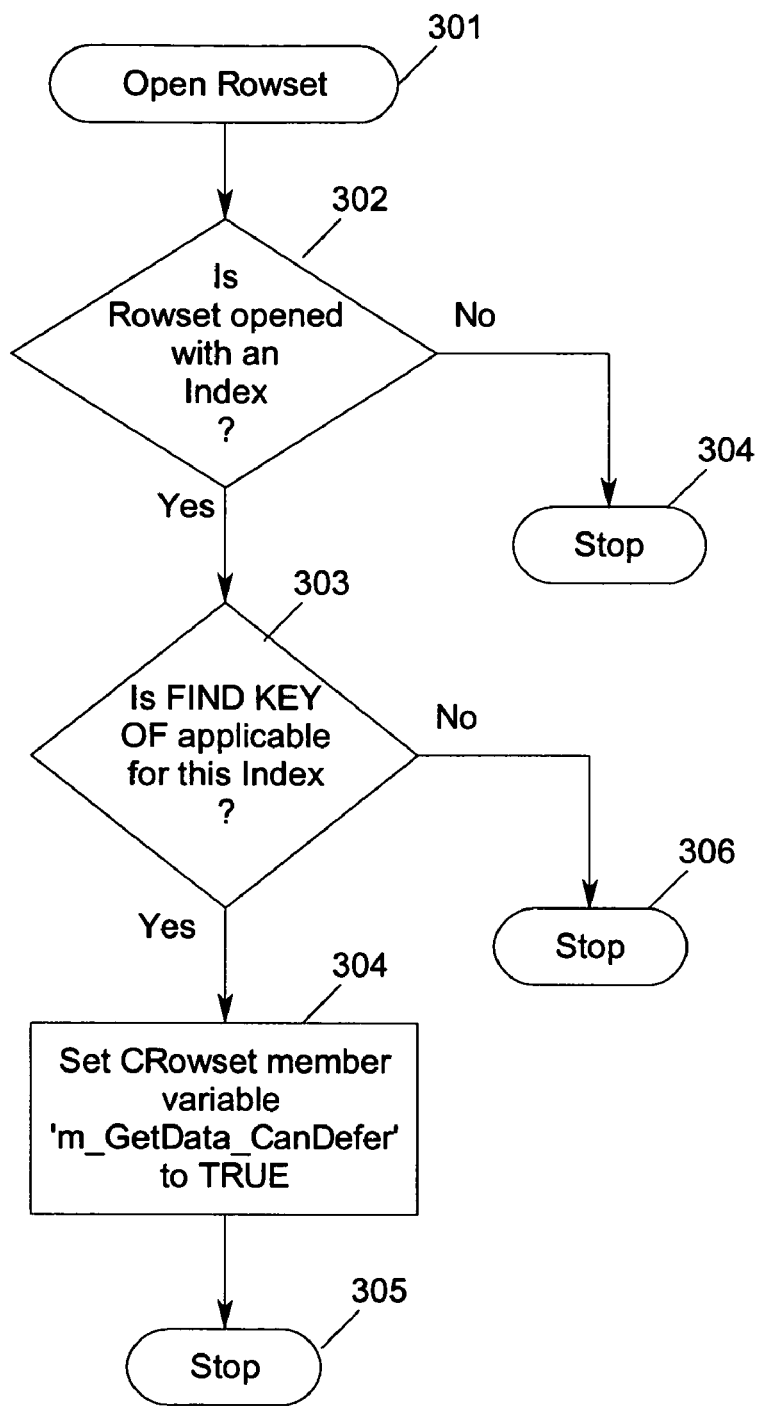
FIG. 3 is a flowchart of the process for opening a rowset.

FIG. 3 is a flowchart illustrating the process for opening a rowset. The process begins at step 301 and follows to make an inquiry to check if a rowset is opened with an index (Diamond 302). If the rowset is not opened with an index (NO), the process stops at step 304. If the answer to inquiry 302 is YES, and the rowset is indeed opened with an index, another inquiry is made (Diamond 303) to check if the FIND KEY OF is applicable for this index. If the FIND KEY OF is not applicable (NO), the process stops at step 306. If the FIND KEY OF is applicable for this index (YES), the CRowset member variable 'm_GetData_CanDefer' is set to true (Block 304). The process then stops at step 305. It should be noted that this is the initial setting up of the CRowset object. 'm_GetData_CanDefer' is a Boolean member variable in this object which indicates to subsequent fetch methods whether FIND KEY OF can be used at all, Note: The applicability of FIND KEY OF (or a similar method of column retrieval) is implementation specific. For example, in the case of DMSII, the index has to be materialized (i.e. it should not be virtual) and the collation should be ASERIESNATIVE (the native sort order for ClearPath MCP machines).

Figure 4:
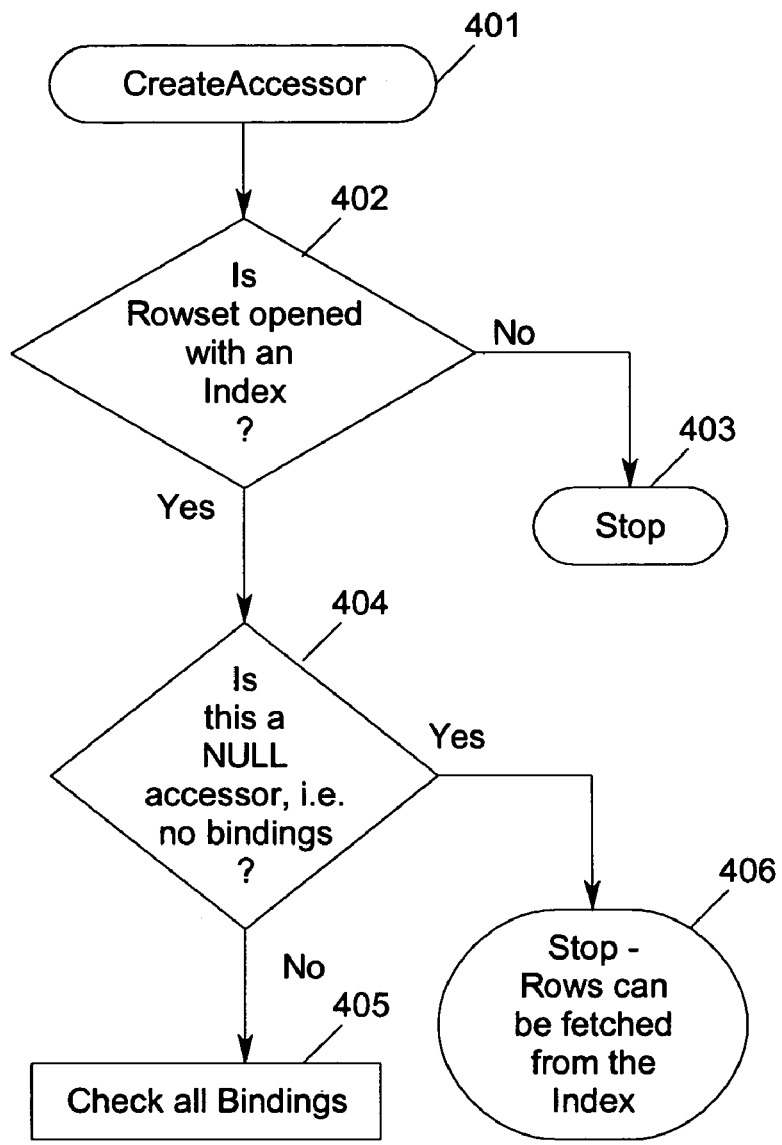
FIG. 4 is a flowchart of the process for creating an accessor.

FIG. 4 is a flowchart illustrating the process for the CreateAccessor method, which is used to create an accessor. The process begins at step 401, and proceeds to make an inquiry to check if the rowset is opened with an index (Diamond 402). If the rowset is not opened with an index (NO), the process stops at step 403. If the rowset is indeed opened with an index (YES), another inquiry is made (Diamond 404) to check if this is a NULL accessor (i.e. no bindings). If there are no bindings (YES), the process stops so that rows can be fetched from the index (Block 406). If there are bindings (NO to inquiry 404), all bindings are checked at step 405. A column in a row and its association with the application's data buffer is described in a binding. An accessor can contain multiple such bindings, one for each column for which an application wishes to retrieve data. The provider checks whether all the bindings refer to only key and keydata columns for the index being used.

Figure 5:
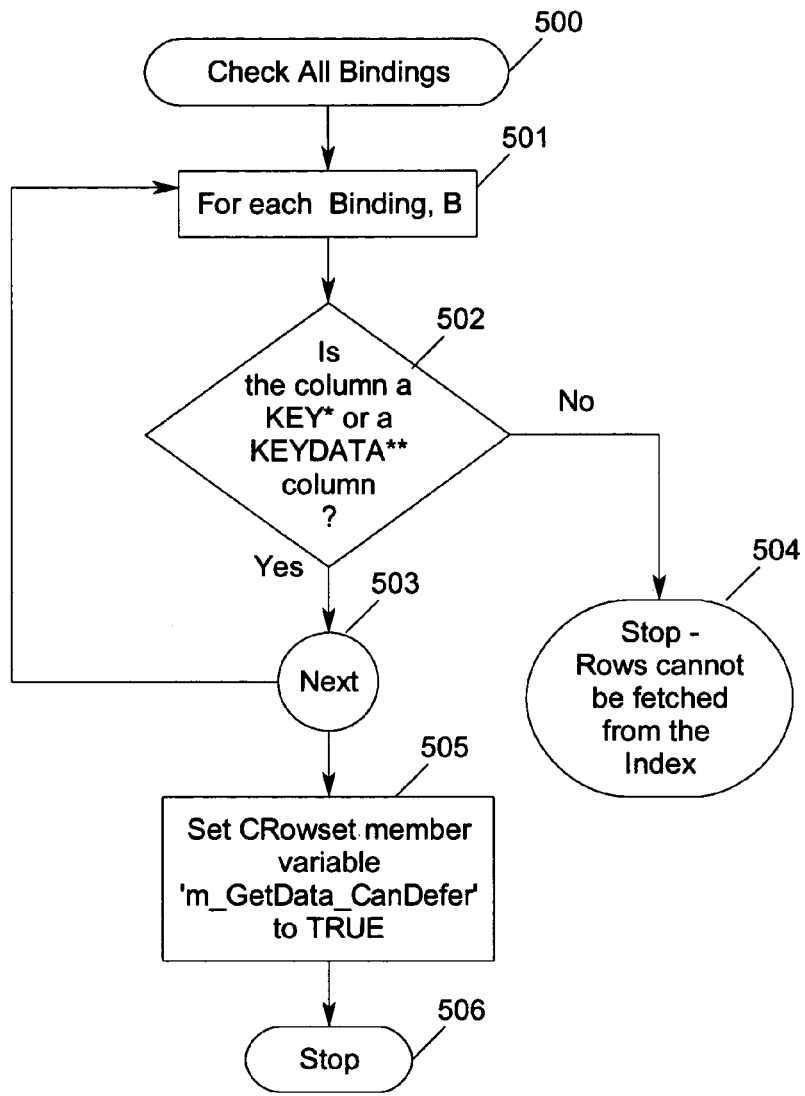
FIG. 5 is a flowchart of the process for checking all bindings in a column.

FIG. 5 is a flowchart illustrating the process for checking all bindings, which begins at step 500. For each binding, B (step 501), an inquiry is made to check if the column is a KEY* or a KEYDATA** column (Diamond 502). If the column is neither a KEY* or a KEYDATA* column (NO to inquiry 502), then the process stops and rows cannot be fetched from the index (Block 504). If the column is a KEY* or KEYDATA** column (YES to inquiry 502) then the process continues next (Step 503) and checks for each subsequent binding B again at step 501. If all column bindings turn out to be referring to only KEY* and KEYDATA** columns for the index then the CRowset member variable 'm_GetData_CanDefer' is set to true at step 505. 'm_GetData_CanDefer' is a Boolean member variable in this object which indicates to subsequent fetch methods whether FIND KEY OF can be used at all. The process then stops at step 506. It should be noted that a KEY* column is a column that is used for collating an index. A collation specifies the bit patterns that represent each character (i.e. the character set) and the rules by which characters are sorted and compared. In a computer, characters in a character set are represented by different patterns of bits being either ON or OFF. There are 8 bits in a byte, and the 8 bits can be turned ON and OFF in 256 different patterns. A program that uses 1 byte to store each character can therefore represent up to 256 different characters by assigning a character to each of the bit patterns. There are 16 bits in 2 bytes, and 16 bits can be turned ON and OFF in 65,536 unique patterns. A program that uses 2 bytes to represent each character can represent up to 65,536 characters. Most applications either use 1 byte or two bytes to represent one character. A sort order specifies the rules used by the system to interpret, collate, compare, and present character data. For example, a sort order defines whether 'a' is less than, equal to, or greater than 'b'. A sort order defines whether the collation is case-sensitive, for example whether 'm' is equal or not equal to 'M'. It also defines if the collation is accent-sensitive, for example whether 'as' is equal or not equal to 'ā'. A KEYDATA** column is a column that is present in an index structure to provide fast access but is not used for collation.

Figure 6:
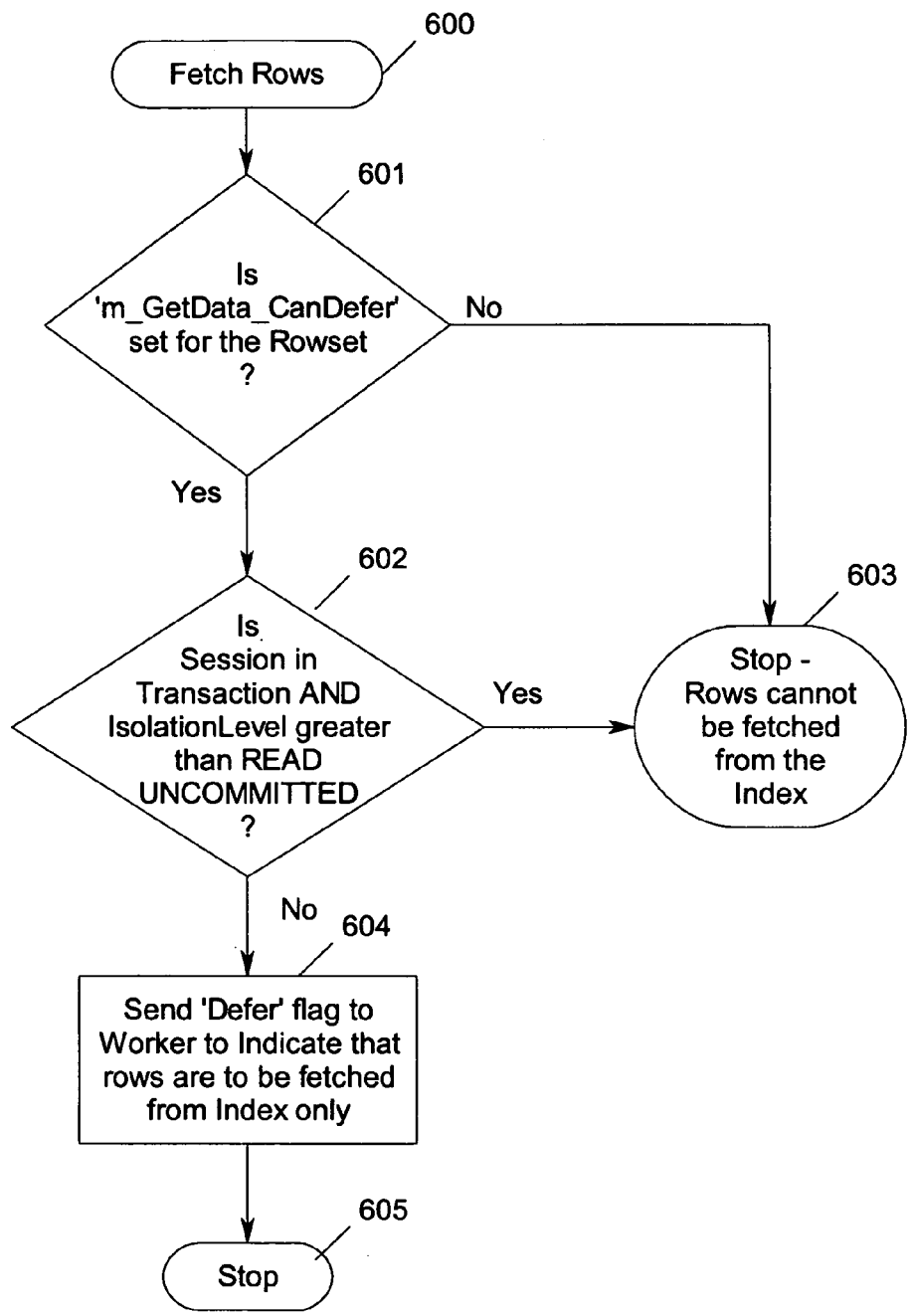
FIG. 6 is a flowchart of the process for fetching rows.

FIG. 6 is a flowchart illustrating the process for fetching rows, which begins at step 600. An inquiry is made to check if 'm_GetData_CanDefer' is set for the rowset (Diamond 601). If 'm_GetData_CanDefer' is not set for the rowset (NO to inquiry 601), then the process stops and rows cannot be fetched from the index (Block 603). If 'm_GetData_CanDefer' is set for the rowset (YES to inquiry 601), another inquiry is made to check if the database session is in transaction AND the IsolationLevel of the transaction is greater than READ UNCOMMITTED (Diamond 602) There are four isolation levels: Read Uncommitted, Read Committed, Repeatable Read and Serializable. Of these, Read Uncommitted provides the lowest isolation while Serializable ensures the highest isolation possible. Transaction isolation levels are a measure of the extent to which changes made outside a transaction are visible to the said transaction. The isolation levels defined by OLE DB are as follows:

(i) Read Uncommitted (also called Browse)—A transaction operating at the Read Uncommitted level can see uncommitted changes made by other transactions. At this level of isolation, dirty reads, nonrepeatable reads, and phantoms are all possible.

(ii) Read Committed (also called Cursor Stability)—A transaction operating at the Read Committed level cannot see changes made by other transactions until those transactions ar committed. (A transaction ends when the consumer calls ITransaction::Commit or ITransaction::Abort, at which time all changes to the rowset that have been transmitted to the data store are committed or aborted. When committing a transaction, the database engine safe-stores all the update activity [explicit and implicit] that happened during the duration of the transaction in files called transaction logs. These logs help in the redo recovery process should it be required).. At this level of isolation, dirty reads are not possible but nonrepeatable reads and phantoms are possible.

(iii) Repeatable Read-A transaction operating at the Repeatable Read level is guaranteed not to see any changes made by other transactions in values it has already read. At this level of isolation, dirty reads and nonrepeatable reads are not possible but phantoms are possible.

(iv) Serializable (also called Isolated)—A transaction operating at the Serializable level guarantees that all concurrent transactions interact only in ways that produce the same effect as if each transaction were entirely executed one after the other. At this isolation level, dirty reads, non-repeatable reads, and phantoms are not possible.

If the session in transaction AND IsolationLevel is greater than READ UNCOMMITTED (YES to inquiry 602), then the process stops and rows cannot be fetched from the index (Block 603). If the session in transaction AND IsolationLevel is not greater than READ UNCOMMITTED (NO to inquiry 602), a 'Defer' flag is sent to Worker to indicate that rows are to be fetched from Index only (Block 604). The process then stops at step 605. It should be noted that among the four isolation levels described earlier, the lowest isolation level Read Committed does not ensure at all that the transaction is in isolation from the effects of other concurrent transactions while the highest isolation level Serializable ensures that the transaction is completely in isolation from the activities of other concurrent transactions.

Figure 7:
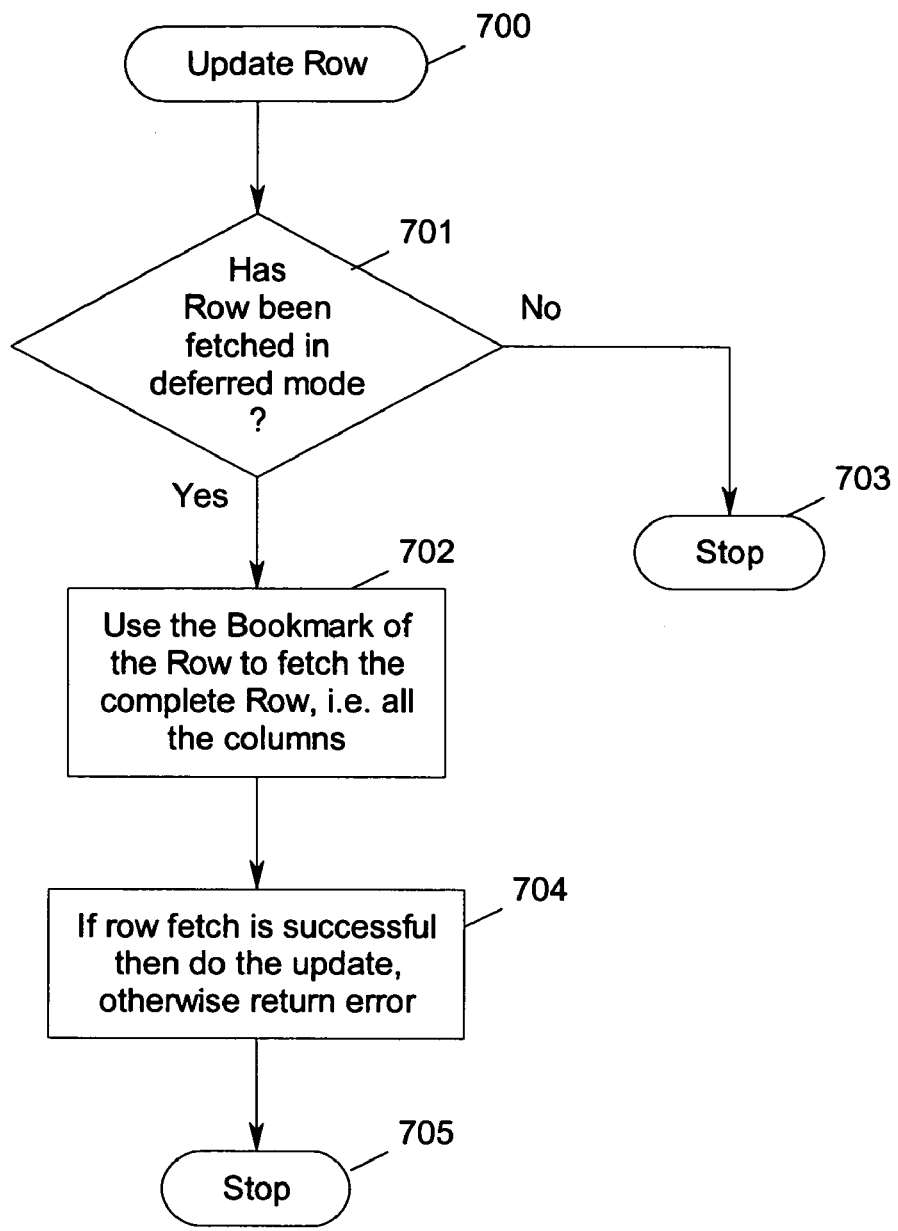
FIG. 7 is a flowchart of the process for updating rows after a row fetch.

FIG. 7 is a flowchart illustrating the process for the updating of rows in the Database server 104, which begins at step 700. An inquiry is made at step 701 to check if a row has been fetched in deferred mode. If the row has not been fetched in deferred mode (NO), the process stops at step 703. If the row has been fetched in deferred mode, the bookmark of the row is used to fetch the complete row (i.e. all the columns) at step 702. The Provider 25 maintains in its cache each row that has been fetched from the database along with some extra runtime attributes. One of the extra attributes (Boolean) is whether the row was fetched with FIND KEY OF. If the row has indeed been fetched with FIND KEY OF, the attribute is true and we refer to that here as "the row was fetched in deferred mode". In other words, not all columns of the row are available in this case. If the row fetch is successful, the update is done, (or else an error is returned to the application) at step 704. The process then stops at step 705.

Figure 8:
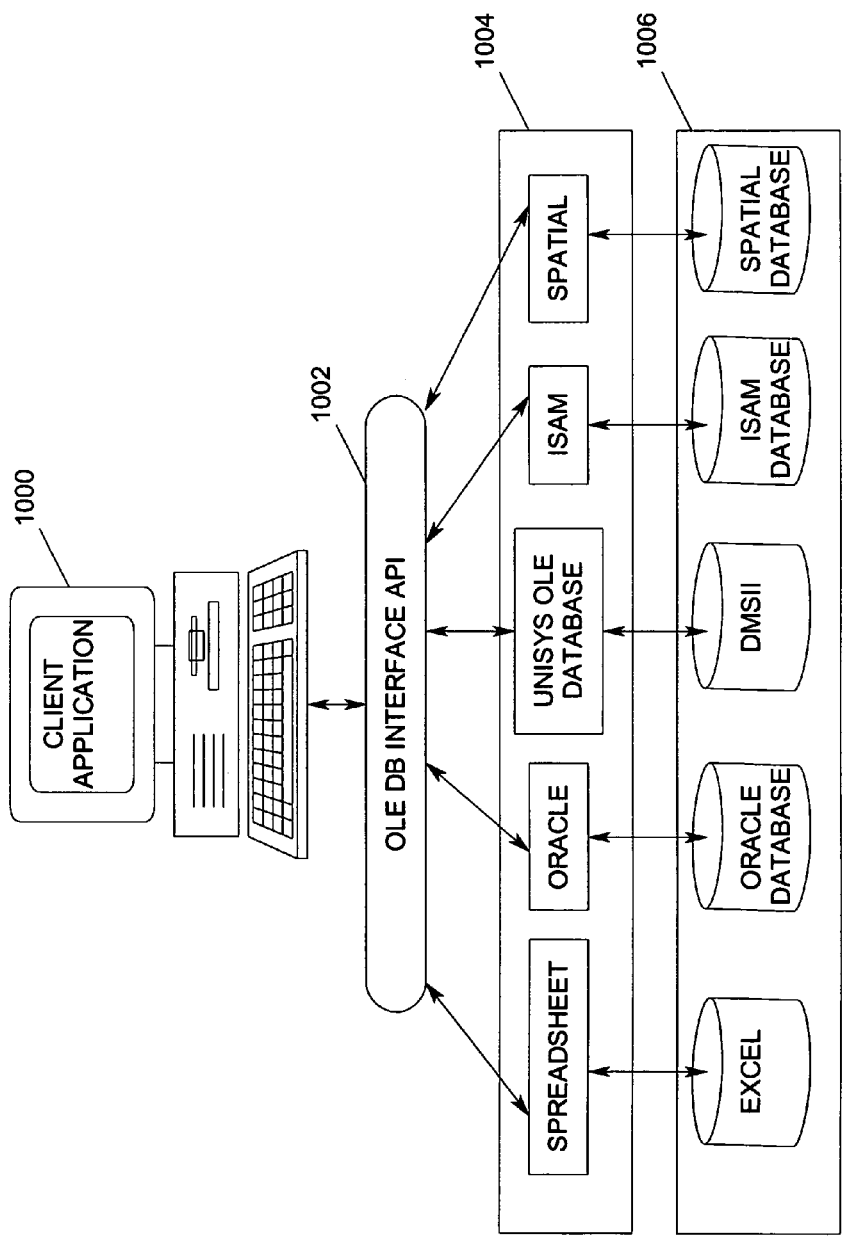
FIG. 8 is an extended block diagram of other exemplary systems that may employ the methods and system of the present invention.

FIG. 8 is an extended block diagram of exemplary systems that may employ the methods and system of the pr sent invention. A client application 1000 can use OLE DB interfaces 1002 to interface with various OLE DB-modeled Providers 1004, wherein each OLE DB-modeled Provider interfaces with a different one of the various databases 1006, such as Excel, Oracle database, ISAN database and Spatial database, as shown.

FIG. 9A is a screen shot which illustrates the schema for tables and indexes. In this illustration, the name of the database is NORTHWINDOLAP and it consists of several tables and indexes, which are listed on the left hand pane. In the top right-pane, more information about the database itself is listed such as the Coded Character Set, which is EBCDIC in this case. In the bottom right-hand pane individual characteristics about the tables in the database are listed such as the table organization (Compact, Ordered, Direct etc) and the record length for each row stored in these tables.

FIG. 9B is a screen shot which shows a table called 'products' in the database called 'NORTHWINDOLAP'. This table contains 11 columns (productid thru discontinued). The column unitinfo is an aggregation of unitprice, unitsinstock and unitsonorder and does not exist separately. The item definition column on the lowest right-hand pane gives the DMSII definition (or native definition) of the item or column as defined by the DBA in the DASDL description of the database. The right-most column in this pane gives the OLE DB data type to which the column is generally converted to by the Data Provider.

FIG. 9C is a screen shot which shows an index called 'prod_product_idx' in the database called 'NORTEWINDOLAP'. This index contains 4 columns (productid thru unitsonorder). Only the column productid is a KEY column and is used for collating the index. The other columns (unitprice, unitsinstock and unitsonorder) are stored in the index structure for fast access but are not used for collation and thus these are KEYDATA. The lower right-hand pane gives the same information as the previous diagram. The right upper pane gives information about the index structure itself: namely, that 1) it spans the table called 'products', 2) it is a Sequential index and its keys are stored in ordered sequence and 3) it does not allow duplicate entries, i.e., it is a unique index.

FIG. 10 is a screen showing the Rowsetviewer application that utilizes the OLE DB interfaces to obtain data from a database. The left pane shows that a table called products is being accessed. The right pane shows some of the columns and the data values contained in each of the columns for the various rows contained in the table products. The right pane shows the names of the columns such as productid, productname as headings. Below each of these headings is the data contained in these columns for each individual row. Thus, row 1 contains the value '3' in the productid column, 'Aniseed S.' in the productname column and '1' in the supplierid column. Row contains the value '30' in the productid column, 'Nord-Ost' in the productname column and '8' in the categoryid column.

It should be noted that the various features of the foregoing embodiments have been discussed separately for clarity of description only and they can be incorporated in whole or in part into a single embodiment of the invention having all or some of these features.

Described herein has been a method and system for optimizing an OLE Database Query by utilizing a "FIND KEY OF" feature of a database in a specialized Data Management system. This allows data to be fetched from an Index Structure, which operates significantly faster than queries trying to directly access a base table directly to fetch columns in a LE database.

Although the invention has been described with reference to specific embodiments, this description is not meant to be construed in a limiting sense. Various modifications of the disclosed embodiments as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a Data Management System (DBMS) wherein an Enterprise Database Server operating under a Master Control Program (MCP) operates through a Data Access Module to a Windows™ client application program having a consumer's data buffer, said system holding a base table of information in a Database, a method for managing database queries for data access by managing overhead operations which no longer require access to said base table in said database, said method comprising the steps of:
   (a) providing an index structure having index files wherein each index file contains a Key and Pointer which points to a record in said base table,
   (a1) fetching a limited set of columns from said base table;
   (b) issuing a database fetch request from said index structure wherein step (b) includes the step of:
      (b1) retrieving column information from said index structure;

(c) enabling Online Embedded Database (OLE DB) applications to access selected columns present in said index structure while eliminating the need to access said base table.

2. A system of an Enterprise Database Server operating under a Master Control Program (MCP) which operates through a Data Access Module to a Windows™ client application program which when executed by a computer causes a consumer's data buffer, said Database Server providing an Index Structure holding a Key and Pointer to a record in a table and organized with Rowsets where each row has columns of data, said system comprising:

- (a) means for optimally accessing a specified column of a row in a database from a Windows based Online Embedded Database (OLE DB) application eliminating the need to fetch an entire row from a base table and having client query means for fetching a limited set of columns from a table including:
  - (a1) means to determine if said Rowset was opened with an Index;
  - (a2) means to determine if the command "FIND KEY OF" is applicable for this Index;
  - (a3) means to set the CRowset member variable (m_GetData_CanDefer) to TRUE;
- (b) checking means to determine which columns are present in the Index Structure which spans said table including;
  - (b1) means for creating an accessor for setting up bindings for each column in a row that needs to be accessed including where the column data is to be laid out in the consumers data buffer and which includes a binding for each column in a row;
  - (b2) means to determine the Rowset was opened with an Index, of said Index Structure;
  - (b3) means to check whether said accessor means is a NULL accessor which has no bindings, and where said means to check indicates that said means to check indicates that said accessor means is NOT a FULL accessor, then said means to check includes:
    - (b3a) means to check all bindings including:
      - (b3a1) means to determine for each binding, if the column is a KEY column or KEYDATA column, then said means to determine includes:
        - (b3a1a) means to set a CRowset member variable to indicate deferred column fetch and to enable getting data from said Index Structure,
  - (b4) means to indicate that said specified row can be fetched from an Index Structure;
- (c) database fetch request means for fetching a column from only said Index Structure.

* * * * *